Feb. 24, 1970   C. PETRIDES   3,497,734
TORSION WIRE ELECTRO-MECHANICAL OSCILLATOR
Filed Oct. 9, 1968

Inventor:
Christie Petrides
by Leonard J. Platt
Attorney

United States Patent Office 3,497,734
Patented Feb. 24, 1970

3,497,734
TORSION WIRE ELECTRO-MECHANICAL
OSCILLATOR
Christie Petrides, Medway, Mass., assignor to General
Electric Company, a corporation of New York
Continuation-in-part of application Ser. No. 522,219,
Jan. 21, 1966. This application Oct. 9, 1968, Ser. No.
772,060
Int. Cl. H02k 33/00, 35/00
U.S. Cl. 310—36                                                5 Claims

ABSTRACT OF THE DISCLOSURE

A torsion wire oscillator for a clock wherein an oscillating permanent magnet is spaced a substantial distance from any steel or iron and is polarized to compensate for the effects of the earth's magnetic field. The electromechanical oscillator acts as a frequency standard for the clock motor.

BACKGROUND OF THE INVENTION

This is a continuation-in-part application of an application entitled "Four Pole Torsion Wire Oscillator Magnet," by Christie Petrides, Ser. No. 522,219, filed Jan. 21, 1966, now abandoned.

This invention relates to torsion member clocks and, more particularly, to an improved torsion member mechanism for a torsion member clock.

In a torsion member clock, a battery-powered pulse or AC permanent magnet motor drives the hands of the clock at a rotation rate which is synchronized with and controlled by electrical signals supplied from oscillations of an electromagnetic-mechanical oscillator. The electromagnetic-mechanical oscillator generally comprises a torsion member in the form of a wire having a permanently magnetized member mounted thereon. The magnetized member is positioned within a magnetic field which is established by a coil, and the coil is connected to a regenerative feedback circuit which causes the magnetized member, and therefore the torsion member, to oscillate. The oscillating magnetized member, in turn, induces a signal in the coil which is fed to the motor control circuit to control the motor rate of rotation.

One problem that arises in the use of torsion member clocks is that the permanently magnetized member is spuriously effected by the earth's own magnetic field. Because this effect can be of critical magnitude in such a device as sensitive as a torsion wire oscillator, it is desirable to provide some means for compensating for the effects of the earth's magnetic field. One means that has been developed is to place a second permanent magnet on the torsion wire adjacent to and poled in opposite directions than the original permanent magnet. The effect of this is that the earth's magnetic field produces torque forces on the torsion wire which tend to cancel each other out. This means has greatly increased the size of the torsion members as well as their cost and difficulty of manufacture.

It is therefore an object of this invention to provide an improved means for compensating for the effects of the earth's magnetic field in a torsion member mechanism.

It is another object of this invention to provide a means for compensating for the effects of the earth's magnetic field on the magnetized member of a torsion wire oscillator, which means enables less expensive manufacture and reduced size of the torsion member.

SUMMARY OF THE INVENTION

In accordance with this invention, in one form thereof, a torsion wire oscillator is provided wtih a single permanent magnet which is polarized at the 90° points on its periphery with alternating types of polarity. Like polarity points positioned at opposite sides of the permanent magnet are affected by the earth's magnetic field so as to produce torques on the permanent magnet which tend to cancel each other thereby rendering the total effect on the magnet of the earth's magnetic field a nullity.

BRIEF DESCRIPTION OF THE DRAWINGS

For a more detailed description of this invention, reference is made to the following specification and accompanying drawings in which.

DESCRIPTION OF THE PREFERRED EMBODIMENT

Figure 1:
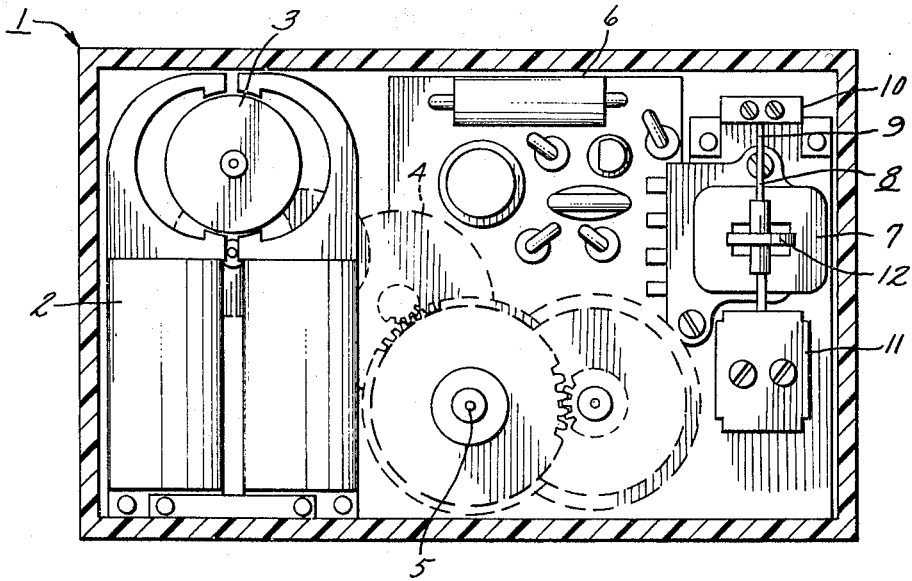
FIG. 1 is an elevation view section showing the general components of a torsion member clock.

Referring now to FIG. 1, a torsion member clock 1 is shown to comprise a pulse or AC permanent magnet motor 2 having a rotor 3 which is coupled in driving engagement with a gear train 4 for driving a pair of clock hands (not shown) by means of a concentric shaft mechanism 5. The rotor 3 is powered by electrical signals from an electrical oscillator circuit 6. Coils 7 are electrically connected to the electrical oscillator circuit 6 and are positioned adjacent to an electromagnetic-mechanical torsion member mechanism 8. The mechanism 8 comprises a torsion wire 9 supported at each end by support members 10 and 11 and including a permanent magnet means 12 mounted on the wire 9.

The general operation of a torsion member clock is as follows: Batteries supply power to the synchronous motor 2 and to the electro-mechanical oscillator 7, 8, 12. The torsion wire 9 is set into oscillation at its mechanical resonant frequency and the inductive coupling existing between the permanent magnet 12 and the electric coils 7 serves to couple driving pulses from the electronic circuit to the torsion wire 9 to maintain it in oscillation and also to couple synchronizing pulses from the torsion wire to the electronic circuit to maintain its oscillation frequency at a fixed rate. The output of the electronic portion of the electro-mechanical oscillator is coupled to the electric coils 2' on the stator pieces 2'' of the synchronous motor 2 so that a pulse field provides rotating energy for the rotor 3. Thus, the rotor 3 rotates at an angular frequency which is accurately maintained proportional to the mechanical resonant frequency of the torsion wire 9. The rotor gear drives the clock hands (not shown) by means of a linking gear train 4.

For a more detailed description of a torsion member clock, and particularly of the motor and the electrical oscillator circuit in a torsion member clock, reference is made to applicant's U.S. Patent No. 3,142,012, July 21, 1964, and a co-pending application of applicant and Harry Albinger, Jr., entitled "Battery Operated Clock," Ser. No. 522,199, filed Jan. 21, 1966.

The torsion wire magnet arrangement 12, 9 has been constructed to so accurately sense the fields induced by coils 7 that its operation could be adversely affected by iron or steel placed in the vicinity of the magnet 12, just as the needle of a magnetic compass would be adversely influenced by iron or steel placed next to it.

Figure 2:
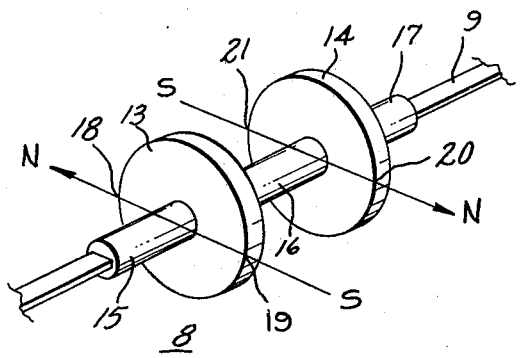
FIG. 2 is a perspective view of a torsion wire and permanently magnetized members according to the teachings of the prior art.

It follows that the torsion magnet arrangement 12, 8 is so sensitive that it could be adversely influenced by the earth's magnetic field. This general problem was also recognized by De Wolf who placed a second permanent magnet on a torsion wire adjacent to and poled in opposite directions than the original permanent magnet. The De Wolf arrangement is shown in FIG. 2 of the instant application and is more fully described hereinafter and more fully described and claimed in his U.S. Patent No. 3,214,662, Oct. 26, 1965 which is assigned to the same assignee as the present application.

As illustrated in FIG. 1, the coils are wound on a bobbin 7 which is formed of nonmagnetic material. As shown, the coil bobbin 7 includes a hollow central portion 7' into which the permanent magnet 12 may partially extend. It can be appreciated that with this air coil construction, the stator coil bobbin 7 is devoid of any steel or iron which would produce restoring forces on the permanent magnet 12 that would grossly overshadow and mask the earth's magnet field effect, and would nullify applicant's improved arrangement for cancelling the effects of the earth's magnetic field.

In order to be able to accurately sense the fields induced by coils 7, the permanent magnet 12 is also spaced as far as possible from any other steel or iron. As shown in FIG. 1, it is evident that the permanent magnet motor 2 is physically separated at a maximum distance from the permanent magnet 12 of the mechanical portion of the electromagnetic oscillator 12, 8. Thus, spurious magnetic couplings of feedback between the mechanical oscillator 12 and the synchronous motor 2 including its coils 2' and steel stator 2" are virtually eliminated.

It can be appreciated that both the prior art De Wolf permanent magnet oscillator as illustrated in Patent No. 3,214,662 and applicant's permanent magnet oscillator are driven by coils which are devoid of any steel or iron stator member and that the oscillator magnet and coils are spaced a substantial distance from any steel or iron. Otherwise, the steel or iron would produce such strong forces on the oscillator magnets that the affect of the earth's field would be masked and the accuracy of the oscillators would be impaired to such an extent that they could not be further affected by the earth's magnetic field, and therefore there would be no reason to provide a means to compensate for the effects of the earth's magnetic field.

A portion of a prior art torsion member mechanism 8 shown in De Wolf Patent No. 3,214,662 is also shown in FIG. 2 of this instant application and includes a torsion wire 9 comprising a flat wire of rectangular cross section and a permanent magnet means 12 comprising a pair of cylindrical permanent magnets 13 and 14 disposed opposite one another with the torsion wire 9 running through their respective centers. Sleeve members 15, 16 and 17 aid in securing the permanent magnets 13 and 14 to the torsion wire 9 and form an integral unit of the wire and magnets. The masses of the magnets 13 and 14 are made as nearly equal to each other as possible. It will be understood that the respective ends of the torsion wire 9 are secured to the support members 10 and 11 and some means for adjusting the total length and tension of the torsion wire will be provided in order to adjust the mechanical oscillating frequency of the torsion member. Also, it will be understood that the electric coils 7 will be placed adjacent one of the magnets 13 or 14 to provide an electromagnetic coupling between the torsion wire oscillator and the electric oscillator circuit 6. The support members 10 and 11, coils 7, and the adjusting means are not shown in FIGS. 2 and 3 for the sake of clarity.

The permanent magnet 13 is indicated to be polarized along a magnetic line such that a point 18 on its periphery is a north pole and a point 19 on its periphery is a south pole. Similarly, the permanent magnet 14 is polarized such that a point 20 on its periphery is a north pole and a point 21 on its periphery is a south pole. The points 18 and 19 lie on a diameter of the magnet 13 as do the points 20 and 21 of the magnet 14. To compensate for the earth's magnetic field the diameters running between the points 18 and 19 of the permanent magnet 13 and running between the points 20 and 21 of the permanent magnet 14 are made parallel to each other in the same plane. Thus, the earth's magnetic field causes torque forces at the points 18 and 20 which are in one direction while causing torques at the points 19 and 21 in the opposite direction. Since the points 18 and 20 are on opposite sides of the torsion wire 9 as are points 19 and 21 and since the masses of the magnets 13 and 14 are equal, the resultant torque due to the earth's magnetic field on the torsion wire 9 is zero.

In order to more perfectly compensate for the effects of the earth's magnetic field, the manufacturing tolerances of the two permanent magnets 13 and 14 must be kept very close so that the torques exerted thereon by the earth's magnetic field are more nearly equal in magnitude. It would be desirable to eliminate the expense necessary to insure proper tolerances in two separate permanent magnets rather than one.

Figure 3:
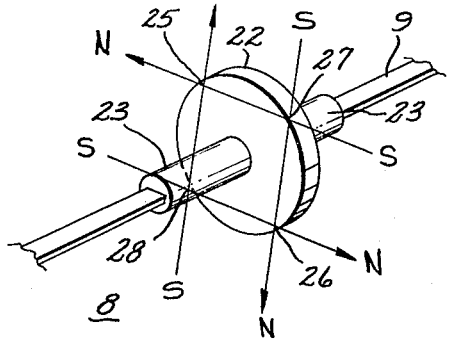
FIG. 3 is a perspective view of a torsion wire and permanently magnetized member according to the teachings of the present invention.

Referring now to FIG. 3, according to the teachings of the present invention the permanent magnet means 8 comprises a single permanent magnet 22 mounted by means of sleeve 23 on the torsion wire 9. At points 90° disposed from each other on the periphery of the permanent magnet 22 are poles of alternating polarity. Thus, the points 25 and 26 are disposed 180° from each other and are north poles, while the points 27 and 28 disposed 180° from each other are south poles. The earth's magnetic field causes torque forces at the points 25 and 26 which are substantially equal in magnitude and in the same direction. Since these points are 180° apart, the torques created tend to cancel each other out with respect to the total torque imparted by the permanent magnet 22 to the torsion wire 9. A similar effect occurs at the points 27 and 28 due to the torque forces due to the earth's magnetic field reacting on the south poles. Thus, compensation for the earth's magnetic field has been effected through the means of a single permanent magnet polarized at four points rather than through the means of a pair of permanent magnets each being polarized at only two points.

By the utilization of the single permanent magnet according to the present invention, the tolerances encountered for the entire mechanism of the torsion member are reduced by approximately one-half over the torsion member mechanism illustrated in FIG. 1. This results because there is only one magnet to manufacture rather than two. Additionally, the fact that only one magnet is necessary results in a cost savings over the prior art torsion member mechanisms. Finally, the length of the entire torsion member and therefore the size of the torsion member clock is reduced by the utilization of only one permanent magnet.

Therefore, it is apparent that applicant has provided an improved torsion member mechanism which results in cost savings, ease in manufacture, and reduced size of the torsion member clock, while maintaining the desired feature of compensation for the effects of the earth's magnetic field. While applicant's invention has been described in terms of a preferred embodiment, it will be apparent to those skilled in the art that other embodiments and modifications may be devised. Therefore, applicant does not wish to be limited to the specific embodiment described but rather wishes to be limited only to the spirit and scope of the appended claims.

What is claimed as new and desired to be secured by Letters Patent of the United States is:

1. In a torsion member clock including an electric motor and an electromagnetic-mechanical oscillator for controlling the speed of the electric motor, a torsion member mechanism comprising:

(a) a torsion member, (b) a magnetized member fixedly secured to said torsion member, said magnetized member being spaced a substantial distance from any steel or iron, (c) said magnetized member being polarized at a plurality of points with alternating polarities such that torque forces exerted on said polarized points by magnetic fields external to the clock tend to cancel each other out, and (d) said magnetized member being driven by a hollow coil devoid of any steel or iron which would produce restoring forces on the magnetized member thereby nullifying the means for cancelling the effects of magnetic fields external to the clock, and said magnetized member being positioned within said hollow coil.

2. The torsion member of claim 1 wherein said plurality of polarized points of alternating polarity lie on the periphery of said magnetized member.

3. In a torsion member clock having an electric motor and an electromagnetic-mechanical oscillator for controlling the speed of the electrical motor, a torsion member for the electromagnetic-mechanical oscillator comprising:

(a) a torsion wire, (b) a permanently magnetized member fixedly secured to said torsion wire for electromagnetically coupling the mechanical portion to the electromagnetic portion of the electromagnetic-mechanical oscillator, said permanently magnetized member being spaced a substantial distance from any steel or iron, (c) said permanently magnetized member being polarized at points 90° disposed from each other with alternating polarities, and (d) said magnetized member being driven by a hollow coil devoid of any steel or iron which would produce restoring forces on the magnetized member thereby nullifying the means for cancelling the effects of magnetic fields external to the clock, and said magnetized member being positioned within said hollow coil.

4. The torsion member as described in claim 3 wherein said polarized points lie on the periphery of said permanently magnetized member.

5. In a torsion member clock including an electric motor and an electromagnetic-mechanical oscillator for controlling the speed of the electric motor, a torsion member mechanism comprising:

(a) a torsion member, (b) a magnetized member fixedly secured to said torsion member, (c) said said magnetized member being polarized at a plurality of points with alternating polarities such that torque forces exerted on said polarized points by magnetic fields external to the clock tend to cancel each other out, and (d) a hollow air coil positioned in inductive relation with said magnetized member, said air coil being devoid of a steel or iron stator which would produce restoring forces on the magnetized member thereby nullifying the means for cancelling the effects of the earth's magnetic field, and said magnetized member being positioned within said hollow coil.

References Cited

UNITED STATES PATENTS

| | | | |
|---|---|---|---|
| 3,161,813 | 12/1964 | De Wolf et al. | 318—138 |
| 3,214,662 | 10/1965 | De Wolf | 318—129 |
| 2,815,477 | 12/1957 | Dunn et al. | 318—132 X |

MILTON O. HIRSHFIELD, Primary Examiner

D. F. DUGGAN, Assistant Examiner

U.S. Cl. X.R.

58—23; 318—138; 331—156